(12) United States Patent
Fukuoka

(10) Patent No.: US 7,021,832 B2
(45) Date of Patent: Apr. 4, 2006

(54) OPTICAL MODULE WITH A COUPLING MEMBER HAVING AN ELLIPTIC OUTER SHAPE FOR COUPLING AN OPTICAL DEVICE THERETO

(75) Inventor: Takashi Fukuoka, Kanagawa (JP)

(73) Assignee: Sumitomo Electric Industries, Ltd., Osaka (JP)

( * ) Notice: Subject to any disclaimer, the term of this patent is extended or adjusted under 35 U.S.C. 154(b) by 0 days.

(21) Appl. No.: 10/926,246

(22) Filed: Aug. 26, 2004

(65) Prior Publication Data
US 2005/0058400 A1 Mar. 17, 2005

(30) Foreign Application Priority Data
Aug. 26, 2003 (JP) .............................. 2003-301274

(51) Int. Cl.
G02B 6/26 (2006.01)
G02B 6/38 (2006.01)
G02B 6/42 (2006.01)

(52) U.S. Cl. ............................ 385/67; 385/52; 385/88; 385/92

(58) Field of Classification Search ................. 385/52, 385/55, 59, 88, 11, 123, 146, 67, 92
See application file for complete search history.

(56) References Cited

U.S. PATENT DOCUMENTS 4,890,896 A * 1/1990 Meis ............................ 385/55
6,004,042 A * 12/1999 Million et al. ................. 385/59
6,459,838 B1 * 10/2002 Varner ......................... 385/123
6,550,981 B1 * 4/2003 Yamauchi ..................... 385/88
6,580,860 B1 * 6/2003 Varner ......................... 385/123

FOREIGN PATENT DOCUMENTS

JP 11-190811 A 7/1999
JP 2002-328204 A 11/2002

* cited by examiner

Primary Examiner—Brian Healy
Assistant Examiner—Mary El-Shammaa
(74) Attorney, Agent, or Firm—Venable LLP; Michael A. Sartori

(57) ABSTRACT

In addition to the optically passive alignment between the optical fiber and the semiconductor device using a V-groove provided on a substrate made of silicon single crystal, the active alignment therebetween may be carried out for enhancing the optical coupling efficiency. According to the present invention, the optical module provides a coupling member including a center waveguide and a sheath member covering the center waveguide. The outer shape of the sheath member is an elliptic so that the center position of the center waveguide may move as the coupling member rotates in the V-groove such that the outer surface thereof touches two sides of the V-groove. Accordingly, the optical coupling efficiency with the semiconductor device may be varied. The ellipticity of the elliptic outer shape is preferably greater than unity and not greater than 2, and the bottom angle of the V-groove is preferably not smaller than 60° and not greater than 120°, in particular, the angle is preferably a right angle in substance.

14 Claims, 5 Drawing Sheets

7,021,832 B2

OPTICAL MODULE WITH A COUPLING MEMBER HAVING AN ELLIPTIC OUTER SHAPE FOR COUPLING AN OPTICAL DEVICE THERETO

BACKGROUND OF THE INVENTION

1. Field of the Invention

The present invention relates to an optical module, in which light emitted from a laser diode may be coupled with a transmission optical fiber via a coupling member having an elliptic outer shape.

2. Related Prior Art

Recently, as the optical communication progresses, it is requested that the optical coupling efficiency between semiconductor optical devices such as laser diode or photodiode and an optical fiber should be enhanced without complex means. One method for the optical coupling between the devices and the optical fiber is known as an active alignment technique. The Japanese patent application published as H10-096839 has disclosed such active alignment technique, in which a package including the laser diode therein and a lens aligned to the laser diode is assembled with a ferrule provided in an end portion of the optical fiber such that the optical output detected via the optical fiber becomes the maximum.

A passive alignment technique, one of the other alignment method, applied to an optical module is also well known, in which the alignment mark and the V-groove are formed on a substrate, and the devices may be coupled with the optical fiber secured within the V-groove by aligning them by using thus formed alignment mark. The Japanese patent application published as H11-190811 has disclosed the optical module including a silicon substrate, on which the V-groove and the alignment mark are formed in a same time, an optical fiber secured within the V-groove, and a semiconductor device passively aligned with the optical fiber in the V-groove.

The Japanese patent application published as 2002-328204 has disclosed an optical module assembled by another passive alignment technique, which is shown in FIG. 8. The optical module 1 shown in FIG. 8 includes a substrate 2 with a V-groove 3 provided thereon, a laser diode 4, an optical fiber and two micro lenses 6a and 6b. The micro lens has a lens 7, an arm portion 8, and a lens holder 9.

One of the micro lens 6a converts divergent light emitted from the laser diode 2 into a parallel beam, while the other micro lens 6b focuses the thus converted parallel beam on the optical fiber 5. These micro lenses 6a and 6b are made by a semiconductor substrate made of silicon single crystal, and have a convex lens 7 with a diameter thereof smaller than that of the optical fiber 5. A semiconductor process such as etching using a photolithography technique may form the convex lens 7. The arm portion 8, extending to both sides of the convex lens 7, is accompanied to pick up the lens 7 at the assembling of the module. Further, the lens holder 9 surrounds and secures the convex lens 7. These micro lenses 6a and 6b are optically aligned with the laser diode 4 and the optical fiber by positioning the lens holder 9 within the V-groove 3 as touching the outer surface of the lens holder 9 to side surfaces of the V-groove 3.

The active alignment technique is useful for an optical fiber with a core diameter of about 9 μm to optically couple in precise with the semiconductor device, such as laser diode or photodiode, or a planar waveguide. However, not only it takes a time to obtain the optimum coupling relation but also it is required for costly equipment and a machine to precisely align devices. Further, additional process such as gluing or welding is necessary for securing and fixing the devices. Accordingly, the module applying the active alignment technique has generally become a cost-effective product.

On the other hand, the passive alignment technique needs relatively short time to assemble the devices compared to the active alignment technique, because the former does not monitor the practical optical alignment between devices. However, to obtain a predetermined coupling efficiency requires a positional accuracy of devices more precise than 1 μm, thereby inevitably requesting the costly equipment. Further, when the optically sensitive spot is scattered in every laser diode, the optical coupling efficiency with the optical fiber secured in the V-groove is inevitably scattered. Thus, only the passive alignment technique can not realize the precise optical alignment between devices, and additional adjustment must be accompanied, which causes the costly optical module.

Moreover, in the case shown in FIG. 8, when the diameter of the lens holder 9 of the micro lens is smaller than that of the optical fiber, the position of the micro lens is rigidly defined in the vertical direction. On the other hand for the horizontal direction, since the outer surface of the lens holder 9 is apart from the side surface of the V-grove 3, the horizontal position of the device is not fixed. By setting the outer diameter of the lens holder 9 to be about the diameter of the optical fiber 5, the lens may be passively coupled with the optical fiber. However, in this case, one of the arm portions 8 is apart from the primary surface of the substrate and the micro lens 6 becomes mechanically unstable in their positions.

In the passive alignment, in order to horizontally align the laser diode 4 mounted on the substrate 2 with the optical fiber 5 secured in the V-groove 3, the laser diode must be finely adjusted in its horizontally position, because the optical fiber 5 and the micro lens 6 are rigidly fixed in the V-groove 3. An image recognition method may be applicable to align the laser diode with the substrate, but such apparatus is costly equipment in general, thereby leaving the subject of the machining cost, the assembling accuracy and the assembling time.

SUMMARY OF THE INVENTION

One object of the present invention is to provide an optical module that solves the subjects above described in the passive alignment technique.

An optical module according to the present invention comprises a substrate, a semiconductor optical device and a coupling member. The substrate has a V-groove that secures the coupling member therein. The coupling member includes a center waveguide and a sheath member for covering the center waveguide. The sheath member has an elliptic outer shape such that a center position of the center waveguide moves when the coupling member rotates within the V-groove as the elliptic outer surface thereof touches two side surfaces of the V-groove, thereby optically coupling the semiconductor optical device with the center waveguide. The semiconductor optical device may be a laser diode or a photodiode.

The elliptic outer shape of the sheath member may have an ellipticity greater than unity and not greater than 2, where the ellipticity is a ratio of a length of a major axis of the elliptic outer shape to that of a minor axis thereof. The V-groove of the present invention may have a bottom angle not smaller than 60° and not greater than 120°. More specifically, the bottom angle is preferably a right angle in substance. The substrate may be made of silicon single crystal and an etching of the silicon substrate may form the V-groove provided on the substrate.

Further, the center waveguide 17 of the coupling member may have a light-converging function in an end surface thereof. The center waveguide may have a convex lens or a Fresnel lens in the end surface thereof.

The optical module of the present invention may further include a transmission optical fiber with a ferrule provided in an end thereof. The substrate may further include a depression for securing the ferrule of the transmission optical fiber. Accordingly, the transmission optical fiber may optically couple with the semiconductor optical device mounted on the substrate through the coupling member secured in the V-groove. By rotating the coupling member in the V-groove, the optical coupling efficiency between the semiconductor optical device and the transmission optical fiber may be enhanced.

Figure 7A:
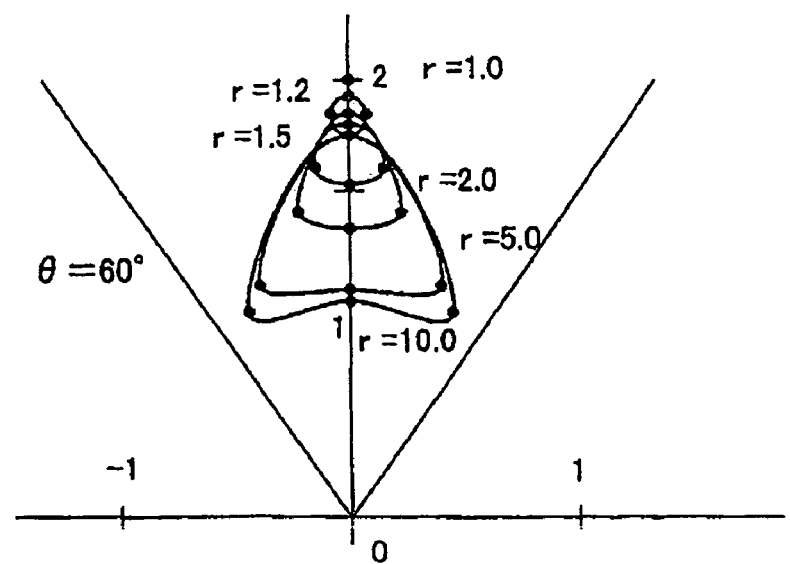
Figure 7B:
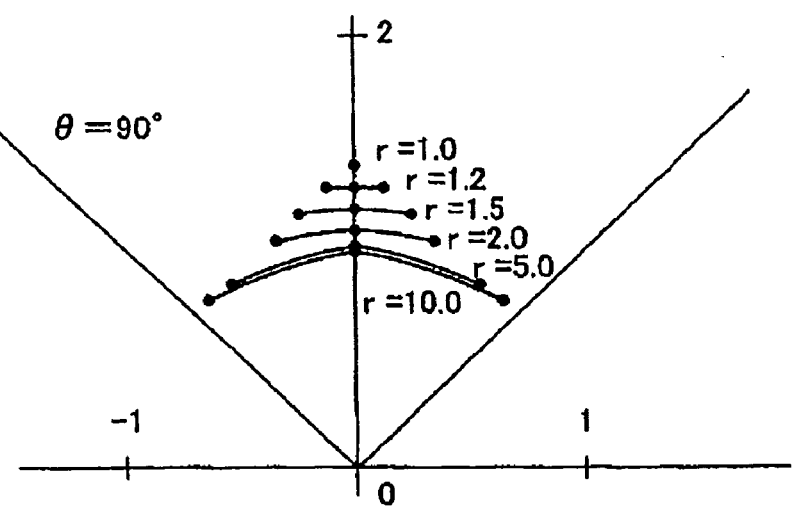
Figure 7C:
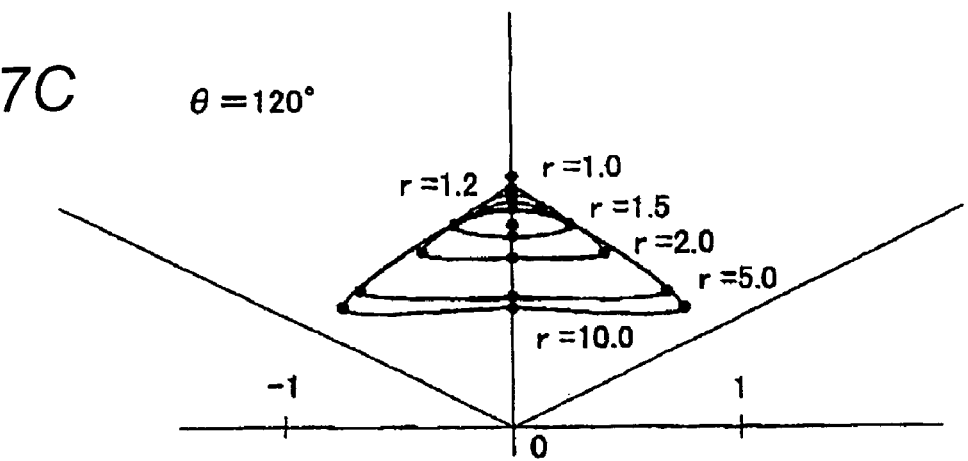
Figure 8:
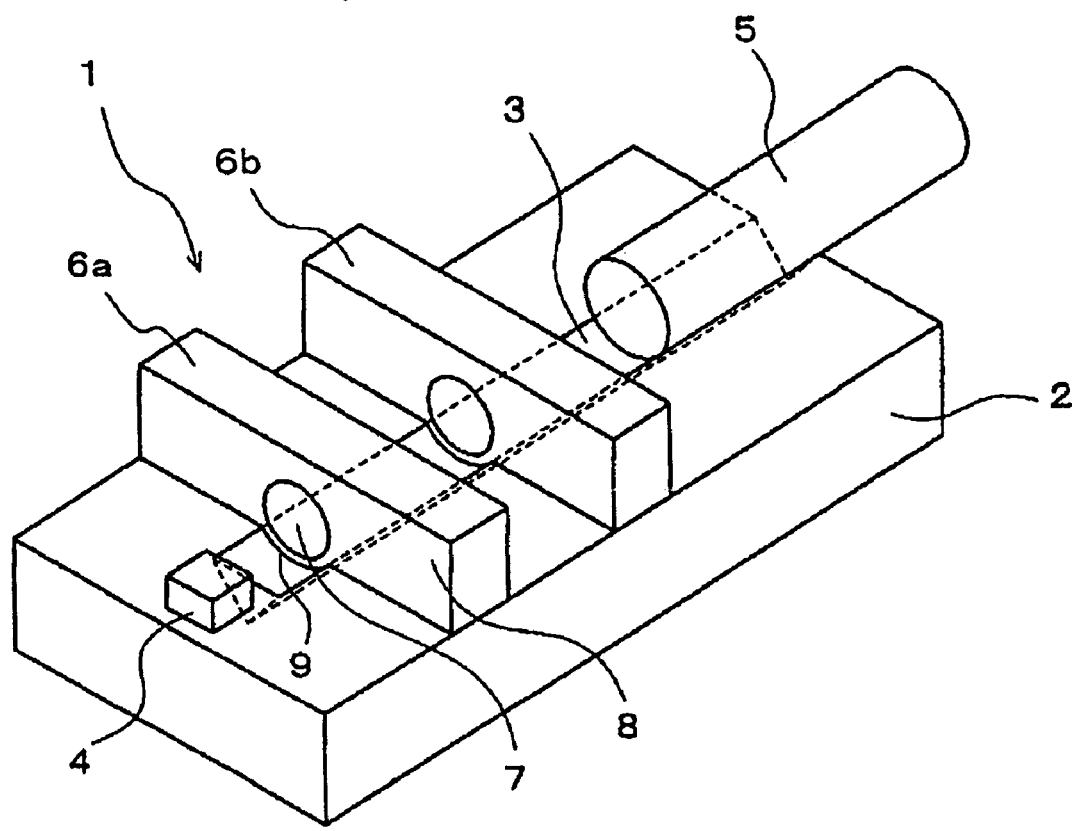

From FIG. 6A to FIG. 6D show center positions of the center waveguide provided in the V-groove as rotating the coupling member within the V-groove;

From FIG. 7A to FIG. 7C show traces of the center position of the coupling member for the bottom angle of the V-groove 60°, 90° and 120°, respectively; and FIG. 8 shows a conventional optical module having a V-groove for securing an optical fiber therein.

DETAILED DESCRIPTION OF PREFERRED EMBODIMENTS

Next, preferred embodiments of the present invention will be described as referring to accompany drawings.

Figure 1:
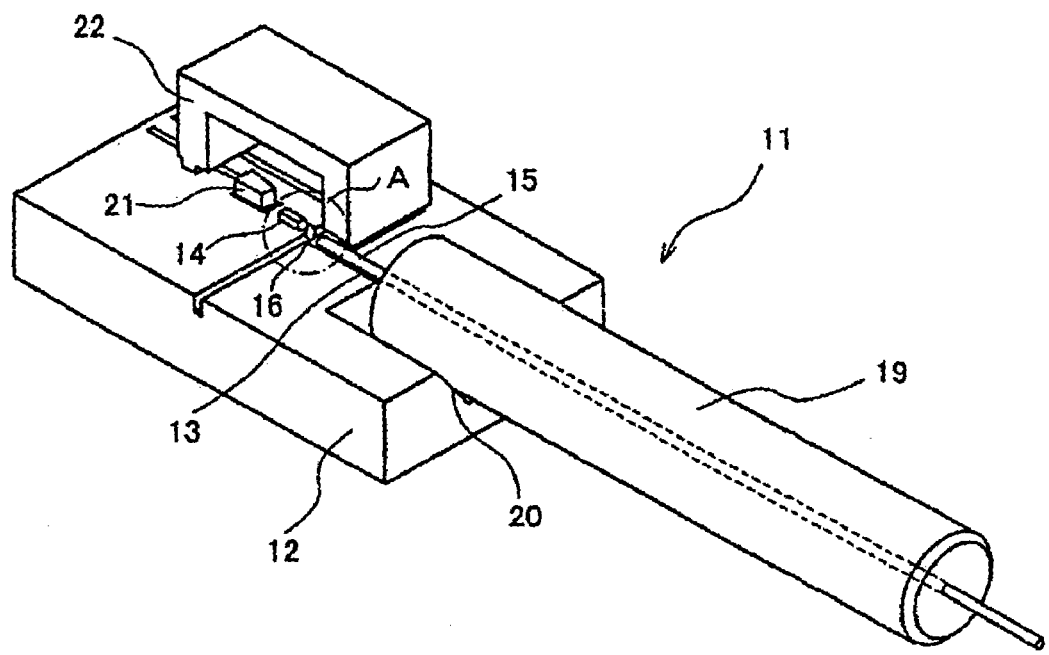
FIG. 1 is a perspective view showing an optical module according to the present invention.
Figure 2:
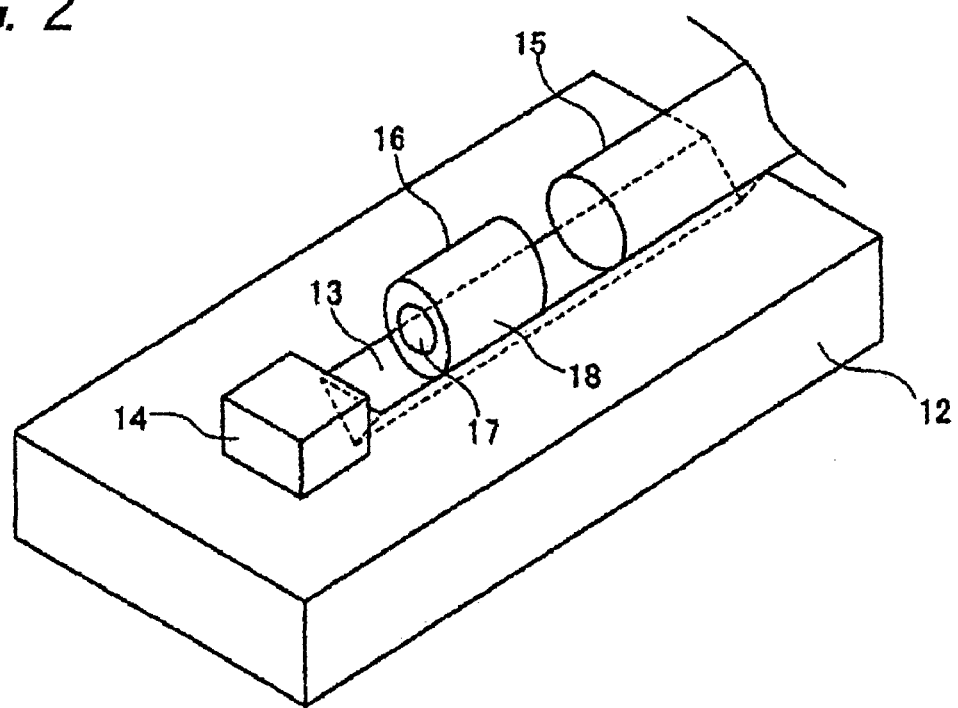
FIG. 2 is an enlarged view showing an optical coupling portion of the optical module.
Figure 3:
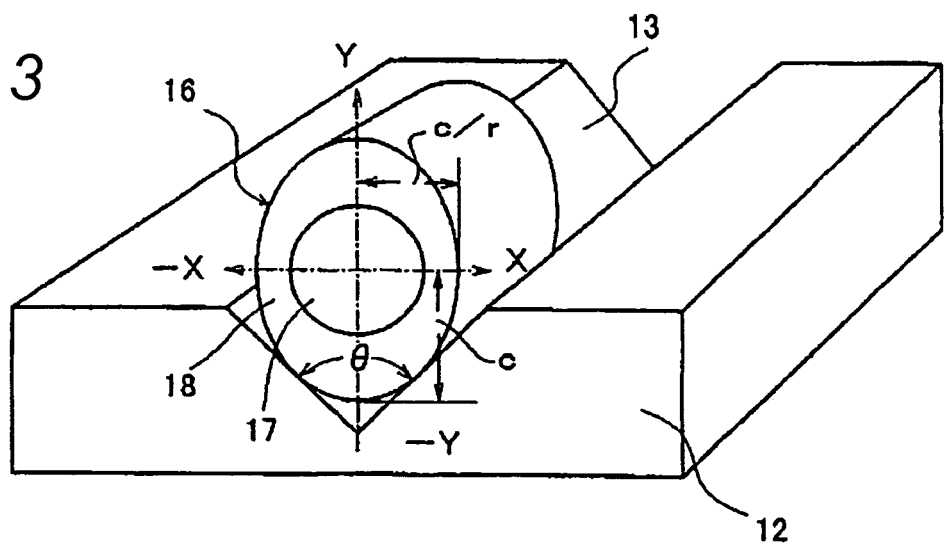
FIG. 3 shows a perspective view showing a coupling member secured in the V-groove.
Figure 4A:
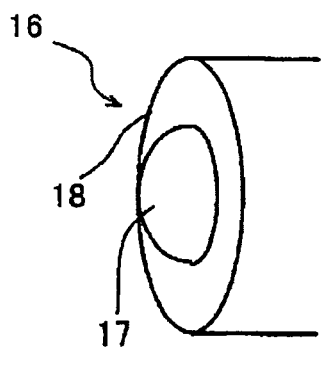
FIG. 4A shows a center waveguide having a convex in the tip thereof and a sheath member surrounding the center waveguide.
Figure 4B:
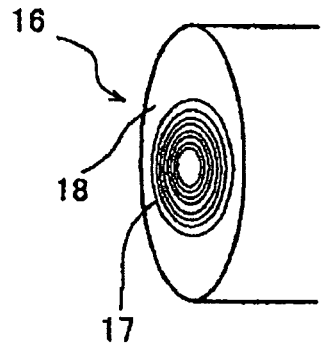
FIG. 4B shows a center waveguide having a Fresnel lens in the tip thereof and a sheath member.
Figure 5:
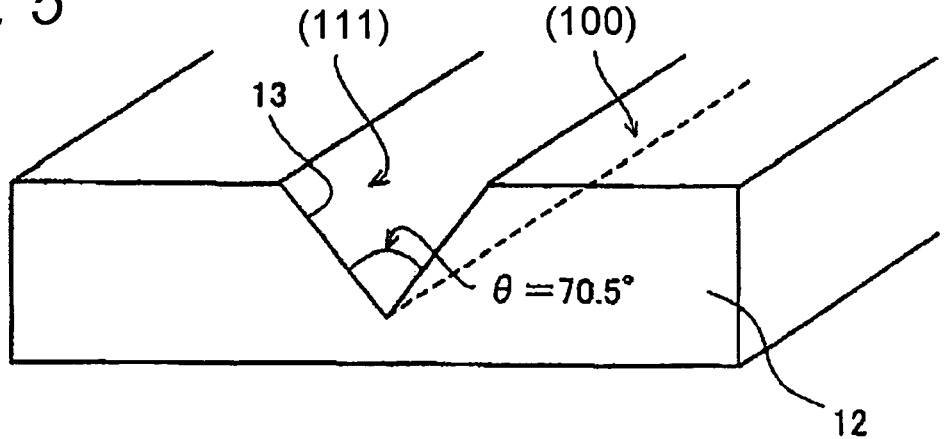
FIG. 5 shows the V-groove formed on a substrate made of silicon single crystal.
Figure 6A:
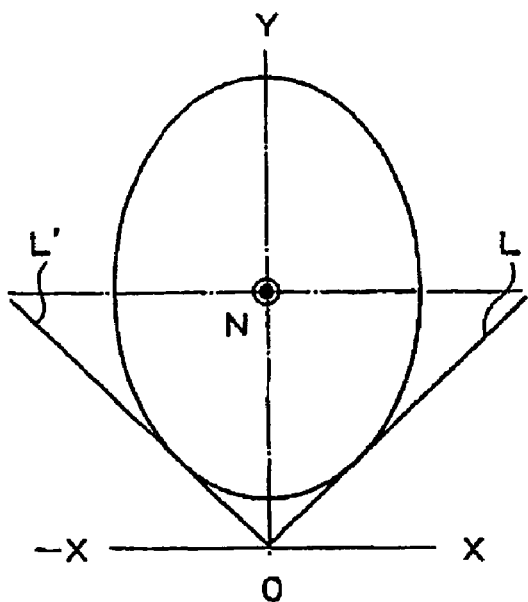
Figure 6B:
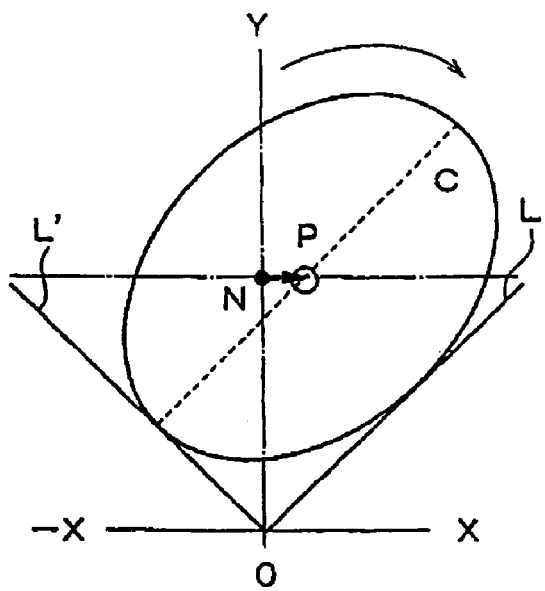
Figure 6C:
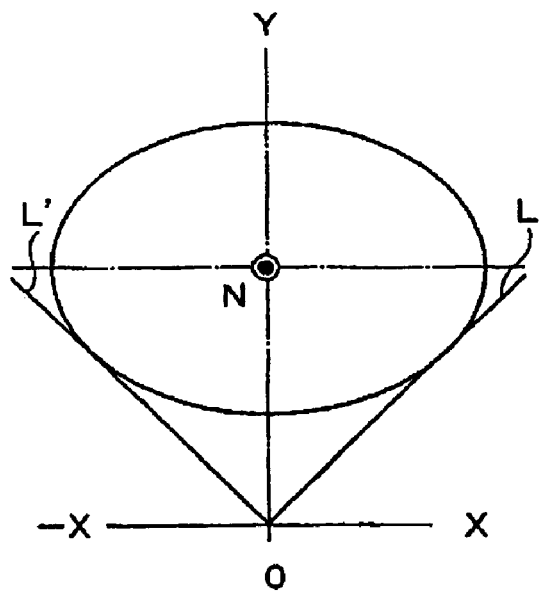
Figure 6D:
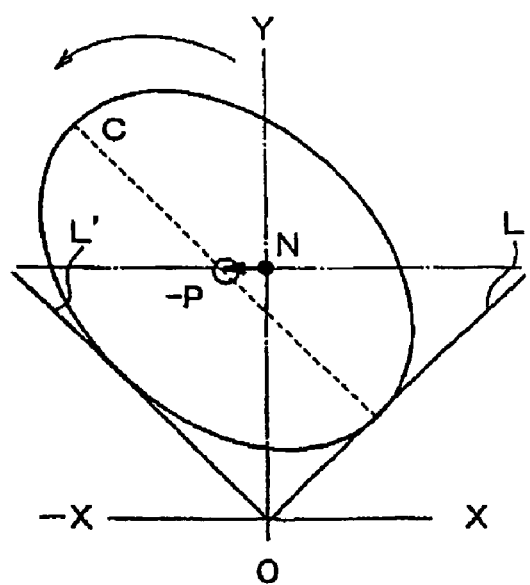

FIG. 1 is a perspective view of an optical module 11 according to the present invention, FIG. 2 is an enlarged view of an optical coupling portion of the optical module 11, and FIG. 3 shows a coupling member that has a sheath member, outer shape of which is an elliptic. The optical module 11 includes a substrate 12 having a V-groove 13 and a depression 20, an optical source 14 such as a semiconductor laser diode, an optical fiber 15, a coupling member 16, a ferrule 19, a light-receiving device 21 such as a photodiode, and a cap 22. The coupling member comprises a center waveguide 17 having a lens in an end surface thereof and an elliptical sheath member 18 surrounding the center waveguide 17.

The substrate 12 mounts the laser diode 14 and the photodiode 21 thereon. Light emitted from the laser diode 14 is coupled with the optical fiber 15 via the coupling member 16. The substrate 12 may be made of silicon single crystal and provides the V-groove 13 for securing the optical fiber 15 therein and the depression 20 for fixing the ferrule 19.

On the substrate 12, in addition to the laser diode 14 and the photodiode 21, interconnections for wiring these devices and alignment marks for aligning these devices against the V-groove 13 are formed. The alignment marks, the V-groove 13, and the depression 20 are formed by an ordinary method such as an etching of the silicon substrate 12 using an etching mask. The cap 22 is also provided on the substrate 12 such that it is aligned to cover the laser diode 14 and the photodiode 21.

The coupling member 16 is secured between the laser diode 14 and the photodiode 15 within the V-groove 13. The coupling member 16 includes the center waveguide 17 with the lens function in the end surface thereof, and the elliptical sheath member 18 covering the center waveguide 17. The center waveguide 17 focuses light emitted from the laser diode 14, which is a divergent light, on the optical fiber 15. The center waveguide 17 may be an optical fiber, both end surfaces of which are formed in convex such that one end surface facing the laser diode 14 converts the divergent light emitted from the laser diode 14 into a parallel beam, and the other end surface facing the optical fiber 15 focuses thus converted parallel beam on the optical fiber 15.

In the present invention, the center waveguide 17 has an elliptical sheath member 18. Accordingly, the coupling member 16 can be rotated as the outer surface of the elliptical sheath member 18 touches two surfaces of the V-groove 13. The elliptical sheath member 18 may be formed by, for example, the etching ordinarily used in the semiconductor processing.

The end surface accompanied with the center waveguide 17 may be a convex as shown in FIG. 3A, or a diffraction lens, which is called as a Fresnel lens. In the case of the Fresnel lens, since the end surface of the waveguide is formed substantially flat, the center waveguide 17 can be shortened and the alignment accuracy along the optical axis, which is in parallel to the axis of the V-groove 13, can be enhanced.

The bottom angle θ of the V-groove 13, and the ellipticity of the sheath member may change the center position of the coupling member, where the ellipticity is a ratio of a length of the major axis to that of the minor axis. Accordingly, the optical coupling efficiency between the laser diode 14 and the optical fiber 15 may be varied by rotating the coupling member within the V-groove 13. The silicon single crystal is usually used for the substrate 12, and when the V-groove 13 is formed by the etching of a (100) surface of the silicon substrate, the bottom angle θ of the V-groove 13 becomes 70.5° because two (111) surfaces appears by the etching as respective side surfaces of the V-groove 13.

Next, an alignment operation of the present invention will be described in detail as referring to FIG. 6 and FIG. 7. When the coupling member 16 rotates within the V-groove 13, the bottom angle θ of which is 90°, the behavior of the center position of the center waveguide 17 moves as shown in FIG. 6. Further, traces of the center position of the center waveguide 17 are shown in FIG. 7 for bottom angles of 60°, 90° and 120°, where the ellipticity of the sheath member 18 is r, which is the ratio of the major axis to the minor axis and is greater than unity.

In FIG. 6, the ellipticity r is set to be 2; i.e. the length of the major axis is twice as that of the minor axis. FIG. 6A shows a case when the major axis of the coupling member 16 is perpendicular, and the center position thereof is denoted as N. In FIG. 6B, the coupling member 16 is rotated and the major axis thereof is parallel to one of the side surface L of the V-groove 13. In this case, the center position horizontally moves from the point N to P. When the coupling member 16 further rotates in the V-groove 13 until the major axis thereof is horizontal as outer surface thereof touches both side surfaces L and L' of the V-groove 13, the center position of the coupling member 16 returns to N as shown in FIG. 6C. FIG. 6D shows a case where the major axis of the coupling member 16 is in parallel to the other side surface L' of the V-groove 13. In this case, the center position thereof horizontally moves from the point N to P', which is an axial symmetry to the point P. Thus, when the bottom angle θ of the V-groove 13 is 90°, the vertical movement of the center position may be quite small, and only the horizontal movement may be obtained.

The table below summarizes the center position of the coupling member 13 when the ellipticity r, the bottom angle θ of the V-groove 13 and the length of the major axis c are changed. When the major axis is horizontal or vertical, the center position locates on the vertical axis; i.e. X=0, while the major axis is in parallel to the side surface of the V-groove 13; i.e. the right side surface L of the V-groove 13, the center position X becomes the maximum. When the major axis is in parallel to the left side surface L', the center position in the X-direction becomes the minimum; i.e. the axial symmetry position to the point when the major axis is in parallel to the right side surface L. The table below only shows the maximum condition; i.e. when the major axis is in parallel to the right side surface L.

elliptic, in particular, in the case where the ellipticity r is smaller than 2. According to FIGS. 7A to 7C, the trace of the center position of the coupling member 16 becomes a triangle when the bottom angle θ is smaller than a right angle and the height of the triangle becomes larger, which means that the vertical alignment margin becomes large. On the other hand, when the bottom angle θ becomes greater than a right angle, the trace becomes an elliptic and an horizontal alignment margin becomes large. Further, when the bottom angle θ is substantially a right angle, the trace of the center position of the coupling member 16 behaves such that the trace from the point N, which corresponds the major axis of the coupling member is vertical, to the point P, where the major axis is in parallel to one of the side surface of the V-groove 13, and the trace from the point P to the point N', where the major axis is horizontal, overlaps to each other. In particular, when the ellipticity r is smaller than 2, the vertical change of thus overlapped trance is quite small.

In the optical module shown in FIG. 2, an alignment between the laser diode 14 and the optical fiber 15, which is secured in the V-groove 13, is unnecessary along the Y-direction, because the optical fiber 15 is rigidly secured within the V-groove 13 to touch the outer surface thereof to two side surfaces of the V-groove 13, and the level of the laser diode is automatically determined by the thickness of the laser diode. That is, the vertical alignment is carried out

| | The center position of the coupling member | | | |
|---|---|---|---|---|
| gash angle | Horizontal | Vertical | Parallel to side surface | |
| (θ) | (X = 0) | (X = 0) | X | Y |
| 60 | $c\sqrt{3 + \frac{1}{r^2}}$ | $c\sqrt{1 + \frac{3}{r^2}}$ | $c\left[-\frac{1}{r\sqrt{3}} + \frac{1}{2}\sqrt{1 + \frac{1}{3r^2}}\right]$ | $c\left[\frac{1}{r} + \frac{\sqrt{3}}{2}\sqrt{1 + \frac{1}{3r^2}}\right]$ |
| 90 | $c\sqrt{1 + \frac{1}{r^2}}$ | $c\sqrt{1 + \frac{1}{r^2}}$ | $\frac{c}{\sqrt{2}}\left[1 - \frac{1}{r}\right]$ | $\frac{c}{\sqrt{2}}\left[1 + \frac{1}{r}\right]$ |
| 120 | $c\sqrt{\frac{1}{3} + \frac{1}{r^2}}$ | $c\sqrt{1 + \frac{1}{3r^2}}$ | $c\left[-\frac{1}{r} + \frac{\sqrt{3}}{2}\sqrt{1 + \frac{1}{3r^2}}\right]$ | $c\left[-\frac{1}{r\sqrt{3}} + \frac{1}{2}\sqrt{1 + \frac{1}{3r^2}}\right]$ |

FIG. 7 shows traces of the center position of the coupling member 16 for the bottom angle of 60°, 90° and 120°, while the ellipticity r from 1.0 to 10.0. The unity in the ellipticity r means that the sheath member of the coupling member 16 has circular cross section.

FIG. 7A shows the trance when the bottom angle θ is 60°. By rotating the coupling member 16 in the V-groove 13, the trance of the center position becomes nearly triangle with the height thereof is greater than the base. FIG. 7B corresponds to the case where the bottom angle θ is 90°. As described, in this configuration, the change of the center position along the vertical direction becomes quite small, namely the change of the center posing substantially restricted to the horizontal direction, which is different to the former case where the bottom angle is 60°. FIG. 7C corresponds to the case where the bottom angle θ is 120°. In this configuration, the change of the center position along the horizontal direction is greater than that along the vertical direction. However, different to the first case of the bottom angle θ being 60°, the trace becomes a flat triangle or an passively. However, the horizontal alignment is optionally because, although the position of the optical fiber is rigidly determined within the V-groove 13, the horizontal position of the laser diode depends on the mounting process on the substrate 12. For the horizontal alignment of the laser diode, it will be facilitated to apply the configuration of the present invention that the bottom angle θ of the V-groove 13 is nearly 90° and the ellipticity r of the coupling member smaller than 2.

When the bottom angle θ is 90° and the ellipticity r of the coupling member is 1.2, the horizontal change of the center position of the coupling member becomes about +/−0.1 c and that in vertical direction is substantially zero, where c denotes the length of the major axis. When the ellipticity r is 1.5 and 2.0, the horizontal change becomes about +/−0.2 c and +/−0.35 c, respectively. In these cases, the vertical change may be regarded as constant. In these configurations, when the length of the major axis c of the coupling member 16 is half of the outer diameter of the optical fiber, that is 125/2=62.5 μm, an alignment tolerance of +/−6 μm can be obtained for the ellipticity r of 1.2. Similarly, the alignment tolerance of +/−12 µm and +/−20 µm may be obtained for the ellipticity r of 1.5 and 2.0, respectively. These tolerances are quite enough for the horizontal alignment of the laser diode to the single mode fiber.

Although the tolerance may be enlarged by increasing the ellipticity r, the coupling member 16 would be mechanically unstable in the V-groove 13 in the case that the ellipticity is greater than 2, besides the alignment tolerance of +/−20 µm can be obtained for the ellipticity r equal to 2, which is quite enough for the single mode fiber having a core diameter of about 10 µm. Therefore, the ellipticity of the present invention would be preferable greater than unity and smaller than 2, and the bottom angle of the V-groove 13 may be optional around a right angle, which may depend on the alignment tolerance required for the optical module and the manufacturing method thereof.

It should be noted that although the present invention has been described in one embodiment, those skilled in the art will readily appreciate that the present invention is also capable in a variety of forms without departing from its spirit or essential characteristics. For example, although the embodiment shown above only relates to the light-emitting module including the laser diode therein. The present invention may be applicable for the light-receiving module. The described embodiments are to be considered in all respects as illustrative and not restrictive. The scope of the invention is, therefore, indicated by the appended claims rather than by the foregoing description. All changes, which come within the meaning and range of equivalency of the claims, are to be embraced within their scope.

What is claimed is:

1. An optical module, comprising:
    a substrate having a V-groove;
    a semiconductor optical device mounted on said substrate; and
    a coupling member secured within said V-groove, said coupling member including a center waveguide having a center position and a sheath member for covering said center waveguide, said sheath member having an elliptic outer shape whose ellipticity is greater than unity and not greater than 2, where said ellipticity is a ratio of a length of a major axis of said elliptic outer shape to a length of a minor axis of said elliptic outer shape, wherein said center position of said center waveguide moves as said coupling member rotates within said V-groove so that said semiconductor optical device optically couples with said center waveguide.

2. The optical module according to claim 1, wherein said V-groove has a bottom angle not smaller than 60° and not greater than 120°.

3. The optical module according to claim 2, wherein said V-groove is substantially a right angle.

4. The optical module according to claim 1, wherein said center waveguide provides an end surface having light-converging function.

5. The optical module according to claim 4, wherein said end surface is a convex lens.

6. The optical module according to claim 4, wherein said end surface is a Fresnel lens.

7. The optical module according to claim 1, wherein said optical semiconductor device is a laser diode.

8. The optical module according to claim 1, wherein said optical semiconductor device is a photodiode.

9. The optical module according to claim 1, further comprises a transmission fiber with a ferrule provided in an end of said transmission optical fiber, and said substrate further provides a depression for securing said ferrule, said transmission optical fiber being optically coupled with said semiconductor optical device through said coupling member secured in said V-groove.

10. The optical module according to claim 1, wherein said substrate is made of silicon single crystal.

11. A light-emitting module, comprising:
    a semiconductor laser diode for emitting light;
    a transmission optical fiber for transmitting said light emitted from said laser diode, said transmission optical fiber having a ferrule at a tip thereof;
    a coupling member including a center waveguide having a center position and a sheath member for covering said center waveguide, said sheath member having an elliptic outer shape whose ellipticity is greater than unity and not greater than 2, where said ellipticity is a ratio of a length of a major axis of said elliptic outer shape to a length of a minor axis of said elliptic outer shape; and
    a substrate having a V-groove for securing said center waveguide and a depression for securing said ferrule provided in said end of said transmission optical fiber,
    wherein said laser diode optically couples with said transmission optical fiber through said center waveguide of said coupling member by rotating said coupling member within said V-groove.

12. The light-emitting module according to claim 11, wherein said center waveguide has a convex end surface for condensing said light emitted from said laser diode.

13. The light-emitting module according to claim 11, further includes a photodiode for monitoring said light emitted from said laser diode.

14. The light-emitting module according to claim 11, wherein said V-groove has a bottom angle from 60° to 120°.

* * * * *